Feb. 24, 1953      J. B. JOHNSTON      2,629,222
GROUND ROLLER HOLD-DOWN ATTACHMENT FOR LAWN MOWERS
Filed April 17, 1951
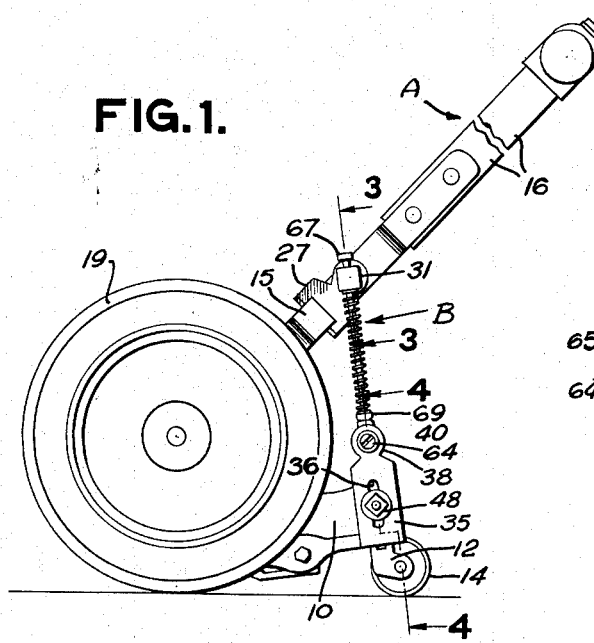
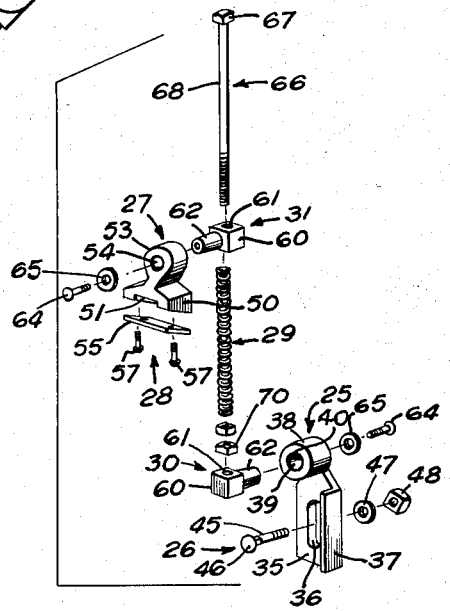
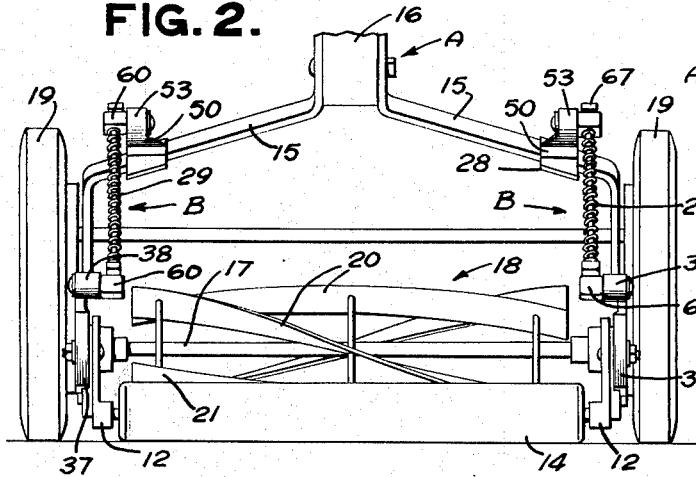
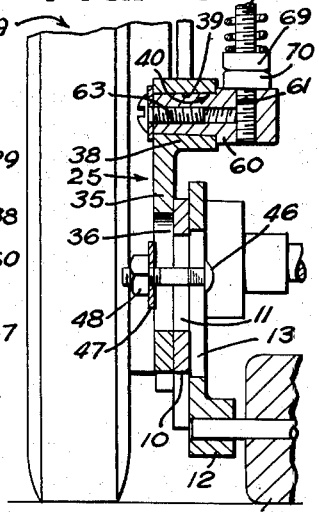
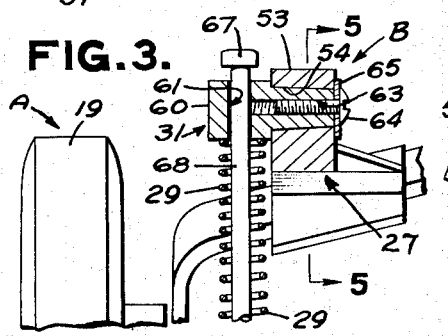
James B. Johnston
Inventor Patented Feb. 24, 1953

2,629,222

UNITED STATES PATENT OFFICE 2,629,222

GROUND ROLLER HOLD-DOWN ATTACHMENT FOR LAWN MOWERS

James Benjamin Johnston, Oklahoma City, Okla.

Application April 17, 1951, Serial No. 221,401

5 Claims. (Cl. 56—249)

This invention relates to improvements in lawn mowers of the class which includes a ground roller to the rear of the cutter reel and bed bar and carried by side plates, with upwardly-extending handle irons pivoted to the side plates.

More specifically it relates to new means for yieldably retaining the ground roller upon the ground while cutting grass of varying height or toughness.

An important object of the invention is to provide such means which permits pivoting of the handle irons so that the handle attached thereto will be at a height convenient for the operator to guide and push the lawn mower.

Another important object is to eliminate drilling or cutting the existing side plates, roller hangers or handle irons in order to attach the new means thereto.

A further important object is to provide means of this kind which may be attached to lawn mowers of various widths.

Furthermore, an important object is to provide such means, including resilient members, the tension of which may be readily adjusted as required, and without employing special tools.

Additionally, an object is to provide means to cushion the sudden jar caused when the side plates pivot upon turning over a lawn mower for the purpose of wheeling it without cutting.

Another object is to provide an attachment for the purposes described and adapted to be secured to the side plates and handle irons of a lawn mower in such a manner that the attachment will not be apt to work loose when the lawn mower is in operation, since the direct connections of the attachment with the side plates and handle irons are not rockable while the lawn mower and attachment are in use but, instead, intermediate portions of the attachment are movable. In one case, the direct connection of the attachment and side plates includes means to prevent movement of the direct connection in the direction it would be apt to move accidently in the event the means were not employed and, in the other case, the direct connection of the attachment and handle iron is a dual one with the direct connection prevented from rocking by a portion of the handle iron snugly recessed in the direct connection.

Other objects and advantages of the invention will be apparent during the course of the following detailed description of the invention, taken in connection with the accompanying drawing, forming a part of this disclosure, and in which drawing:

Fig. 1 is an end elevation of a conventional lawn mower, with the new attachment carried thereby.

Fig. 2 is a rear elevation of the lawn mower of Fig. 1 with two of the attachments operatively associated therewith.

Fig. 3 is an enlarged vertical section through an upper portion of the attachment substantially on the line 3—3 of Fig. 1.

Fig. 4 is an enlarged vertical section through a lower portion of the new attachment, substantially on the line 4—4 of Fig. 1.

Fig. 5 is a vertical section substantially on the line 5—5 of Fig. 3.

Fig. 6 is an exploded perspective view of the elements of the new attachment.

In the drawing, wherein for the purpose of illustration is shown a preferred embodiment of the invention and wherein similar reference characters designate corresponding parts throughout the several views, the letter A designates a lawn mower and the letter B the new attachment.

The lawn mower A is shown as of conventional construction including a pair of pivoted side plates 10, each having a bolt shank-receiving opening 11 for a bolt which secures, to each of the plates 10, the roller hangers 12 which contain openings 13 for bolt shanks and these hangers rotatably support the roller 14. Pivotally secured to the side plates 10 at locations spaced upwardly and forwardly of the connections of the roller hangers 12 therewith, are the handle irons 15 which arch or converge upwardly to the elongated handle 16 which extends upwardly and rearwardly and to which they are secured. Portions of the handle irons 15 are normally above and slightly forwardly of the connections of the hangers 12 with the side plates 10. Because the cutter shaft 17 of the cutter reel 18 is rotatably carried by the side plates 10 and is, in turn carried by pinions (not shown) meshing with gears (not shown) rotatable with the ground wheels 19 when the cutter blades 20 of the cutter reel encounter, for example, tough grass, the pinions ride up the gear wheels, causing the side plates 10 to pivot upwardly, thus carrying the roller 14 with them. Since the bed bar 21 which is associated with the blades 20 for efficient cutting, is fixedly carried by the side plates, it rises too and thus the grass is cut, if at all, too high.

The new attachment B for resiliently holding down the side plates 10 and, of course, retaining the bed bar 21 and roller 14 in operating positions thereby, preferably comprises two each of the elements shown particularly in Fig. 6. These include a lower member or combined bearing and adjustable bracket 25, means 26 to detachably secure the member 25 to a side plate 10, an upper member or combined bearing and adjustable base 27, means 28 to detachably secure member 27 to a handle iron 15, resilient means 29 between the members 25 and 27, means 30 to operatively secure the resilient means 29 to the member 25 and means 31 to operatively secure the resilient means 29 to the member 27.

There is, of course, a left and a right-hand member 25, and their minor differences will be pointed out herein. Each member 25 includes a substantially straight, elongated and upwardly-extending plate portion 35 having a longitudinally-extending elongated opening or slot 36 and a relatively narow marginal flange 37 extending along the rearward longitudinal edge of the plate portion and adapted to overlap and extend against the rearward edge of a side plate 10. Above the plate portion 35, and preferably integral therewith, is a bearing portion 38 having a truncated bore 39 therethrough with the larger mouth of the bore extending inwardly to face the like mouth of the opposite bore 39 in the other bearing portion 38. Obviously, the member 25 of Fig. 4 is a left-hand member as viewed from the rear of the lawn mower A, since the larger mouth 40 of the bore 39 faces to the right and, as in Fig. 2 the flange 37 extends toward the right, while the member 25 of Fig. 6 is a right-hand member, since the flange 37 extends to the left and larger mouth 40 faces toward the left.

The means 26 to detachably secure the member 25 to a side plate 10, with the plate portion flat against the adjacent portion of the plate 10, may be a bolt-nut-and-washer assembly, with the shank 45 of the bolt extending through the vertically-aligned openings 11 and 13 and slot 36, the head 46 of the bolt bearing against the outer face of the hanger 12, the washer 47 bearing against the outer face of the plate portion 35 and the nut 48 upon the shank 45 and bearing against the washer 47. Since the opening 36 is a slot, it is clear that the member 25 may be adjustably held in various up-and-down positions by the means 26.

Referring mainly to Figs. 3, 5 and 6, the upper members or combined bearings and adjustable bases 27 are provided in lefts and rights and each includes a base portion or body 50 adapted to be positioned upon a handle iron 15 since it is provided with a recess 51 having three flat faces for snugly accommodating a portion of a handle iron, and the portion 50 extends outwardly therefrom, with the outwardly-extending ends having screw threaded, screw shank-receiving openings 52 for a portion of the means 28. Each of the members 27 also include a bearing portion 53 preferably integral with the portion 50 and with its truncated-conical bore 54 having its mouth of greatest diameter facing outwardly, as in Fig. 3. As can be seen in Fig. 6 the base portion increases in height from its outer side face so that the axis of the bore 54 will be substantially horizontal when the member 27 is mounted upon the sloping handle iron 15.

In order to detachably secure the member 27 to the handle iron 15, the means 28 is provided and preferably comprises a base plate 55 fitting under the handle iron, projecting outwardly thereof and having screw shank-receiving openings through which extend the shanks 56 of screws with these shanks screwed into the openings 52 and the heads 57 bearing against the under face of the base plate.

The resilient means 29 comprises an elongated, expansion helical spring.

Means 30 to operatively secure the means 29 to the member 25 comprises an abutment 60 for the lower end of the spring of the means 29. This abutment has a bore 61, preferably screw threaded, and from one side of the abutment extends a stub shaft 62 with its axis substantially normal to the axis of this bore 61. The shaft is truncated conical and adapted to extend through the bore 39 for rotation therein. The shaft 62 has a screw-threaded bore 63 normal to the bore 61 to receive the shank of a screw 63 with its head bearing against a washer 65 between the head and the adjacent face of the bearing portion 38.

The means 31 to operatively secure the means 29 to the member 27 is preferably exactly like the means 30, and similar reference characters for like parts are employed. Here the stub shaft 62 is accommodated in the bore 54 and the washer 47 bears against a face of the bearing portion 53. The bore 61 is preferably larger in diameter than the bore in the lower abutment 60 and may not be screw threaded.

Associated with each means 29, as a part of both the means 30 and 31 is an elongated coupling and adjustment member 66. Preferably this is an elongated bolt with its head 67 adapted to engage the upper face of the upper abutment 60, which limits downward movement of the member 66, the shank 68 of the member 66 extending through the openings 61 as well as through the helical spring. The lower end of the shank 68 engages screw threads of the lower abutment 60 while two suitable nuts 69 and 70 above this abutment are adapted to engage the screw threads of the shank 68 and provide for adjusting tension upon the spring by screwing them upwardly or downwardly with reference to the shank 68, and employing an ordinary wrench.

Because of the elongated openings or slots 36, the members 25 may be adjusted vertically, while the bracket portions 35 tend to reinforce the adjacent portions of the side plates 10 and roller hangers 12, particularly since the plate portions 35 cover substantial portions of the roller hanger-carrying ends of the side plates 10.

Upon swinging the handle 16 in an arc in order to raise the roller 14 and bed bar 21 off the ground, for simply wheeling the lawn mower A, the new attachments will be found to prevent the sudden jar occasioned by the side plates pivoting and then coming to a sudden halt.

The flanges 37 prevent rocking of the plate portions 35 in the direction such rocking would be apt to take place in the event the flanges were not employed, and the recessing of portions of the handle irons 15 in the recesses 51 prevent rocking of the base portions 50.

Various changes may be made in the form of the invention, herein shown and described without departing from the spirit of the invention or scope of the following claims.

What is claimed is:

1. A ground roller hold-down attachment for lawn mowers provided with a side plate and a handle iron, said attachment including a lower bearing support; an upper bearing support; first securing means for securing said lower bearing support to said side plate; second securing means for securing said upper bearing support to said handle iron with said upper support adjacent and above said lower support; a bearing carried by each support; a stub shaft for each bearing;

an abutment fixedly carried by each shaft exteriorly of its associated support; expansible resilient means bearing against each abutment; and holding means holding said resilient means in contact with said abutments.

2. A ground roller hold-down attachment according to claim 1, characterized in that said lower bearing support has a flange disposed in contact with an edge of said side plate.

3. A ground roller hold-down attachment according to claim 1, characterized in that said upper bearing support includes, a body provided with a recess, having three flat faces for snugly accommodating three flat faces of a portion of said handle iron.

4. A ground roller hold-down attachment according to claim 1, characterized in that said upper bearing support includes, a body provided with a recess, having three flat faces for snugly accommodating three flat faces of a portion of said handle iron, a rigid member covering said recess and in face contact with another face of said portion, and means securing said member to said body.

5. A ground roller hold-down attachment for lawn mowers, said device including a lower bearing support; an upper bearing support; first securing means for securing said lower bearing support to a lawn mower side plate; second securing means for securing said upper bearing support to a lawn mower handle iron with said upper support adjacent and above said lower support, a bearing fixedly carried by each support; a stub shaft for each bearing; an abutment fixedly carried by each shaft exteriorly of its associated support; expansible resilient means bearing against each abutment; and holding means holding said resilient means in contact with said abutments, said resilient means comprising an expansion helical spring, and said holding means comprising an elongated member slidably extending through said spring and one of said abutments and extending into the other abutment, and adjustable means for adjustably securing said elongated member to said other abutment for selected projection at various distances out of said other abutment.

JAMES BENJAMIN JOHNSTON.

REFERENCES CITED

The following references are of record in the file of this patent:

UNITED STATES PATENTS

| Number | Name | Date |
|---|---|---|
| 1,754,741 | Cobb et al. | Apr. 15, 1930 |
| 2,532,813 | Hussey et al. | Dec. 5, 1950 |